United States Patent
Isogawa et al.

(10) Patent No.: US 12,548,300 B2
(45) Date of Patent: Feb. 10, 2026

(54) TRAINING APPARATUS, TRAINING METHOD, AND STORAGE MEDIUM

(71) Applicant: KABUSHIKI KAISHA TOSHIBA, Tokyo (JP)

(72) Inventors: Kenzo Isogawa, Tokyo (JP); Toshiyuki Ono, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 352 days.

(21) Appl. No.: 18/457,475

(22) Filed: Aug. 29, 2023

(65) Prior Publication Data

US 2024/0185581 A1    Jun. 6, 2024

(30) Foreign Application Priority Data

Dec. 5, 2022 (JP) .................. 2022-193983

(51) Int. Cl.
*G06V 10/77* (2022.01)
*G06T 7/00* (2017.01)
*G06T 7/11* (2017.01)
*G06V 10/774* (2022.01)
*G06V 10/764* (2022.01)

(52) U.S. Cl.
CPC .......... *G06V 10/774* (2022.01); *G06T 7/0004* (2013.01); *G06T 7/11* (2017.01); *G06T 2207/20076* (2013.01); *G06T 2207/20081* (2013.01); *G06T 2207/30108* (2013.01); *G06V 10/764* (2022.01)

(58) Field of Classification Search
CPC .... G06V 10/774; G06V 10/764; G06V 10/82; G06T 7/0004; G06T 7/11; G06T 2207/20076; G06T 2207/20081; G06T 2207/30108

USPC ........................................ 382/141
See application file for complete search history.

(56) References Cited

U.S. PATENT DOCUMENTS

| 2018/0260628 A1* | 9/2018 | Namiki | G06F 18/2413 |
| 2023/0244930 A1* | 8/2023 | Kim | G06N 3/0464 |
| | | | 706/25 |

OTHER PUBLICATIONS

Deepak Pathak, et al., "Fully Convolutional Multl-Class Multiple Instance Learning," ICLR 2015, arXiv:1412.7144v4, 4 pages (2015).
Deepak Pathak, et al.,"Constrained Convolutional Neural Networks for Weakly Supervised Segmentation," ICCV 2015, pp. 1796-1804 (2015).

* cited by examiner

*Primary Examiner* — Neil R Mclean
(74) *Attorney, Agent, or Firm* — Finnegan, Henderson, Farabow, Garrett & Dunner, LLP

(57) ABSTRACT

A training apparatus includes a circuitry. The circuitry inputs a bag that is a set of an instance to an identifier and outputs a probability sequence including a probability that each instance belonging to the bag corresponds to a target. The circuitry calculates a bag likelihood that is a probability that specific instances corresponding to the target are included in the bag. The circuitry outputs an expected instance quantity regarding a quantity of the specific instances included in the bag. The circuitry calculates a parameter update amount based on teaching data, the bag likelihood, and the expected instance quantity, and updates a parameter of the identifier based on the parameter update amount.

13 Claims, 7 Drawing Sheets

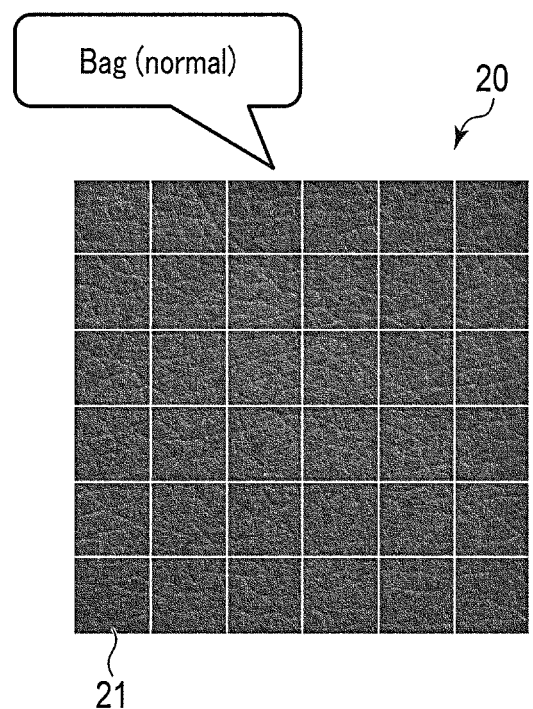
F I G. 2
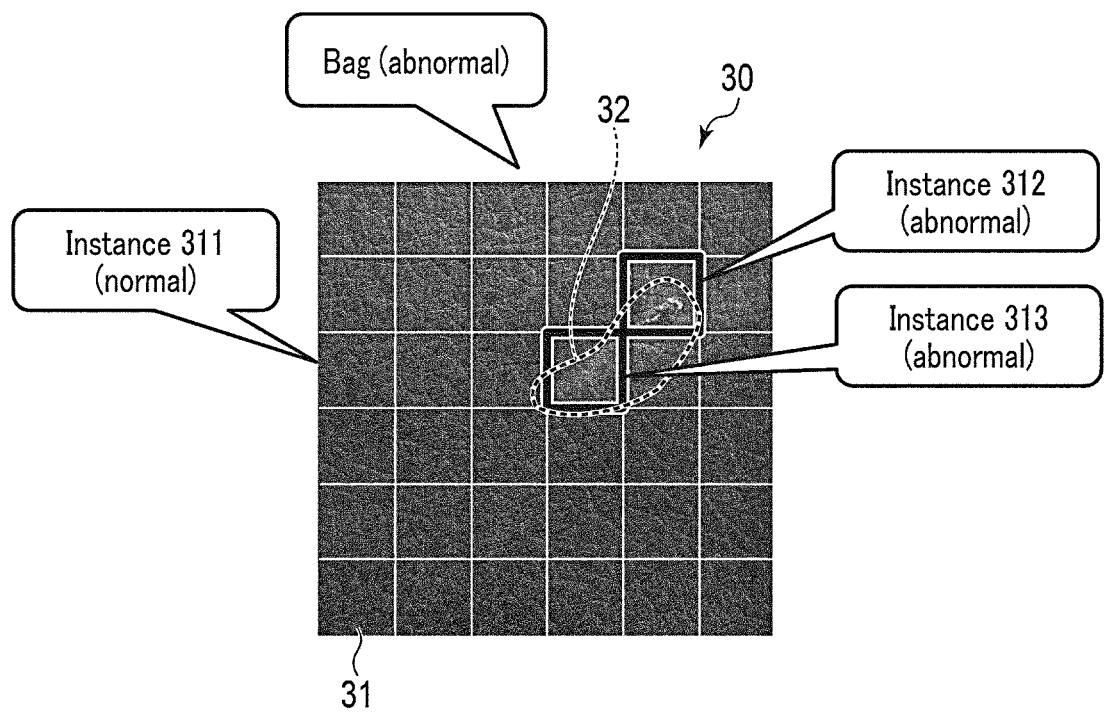
F I G. 3

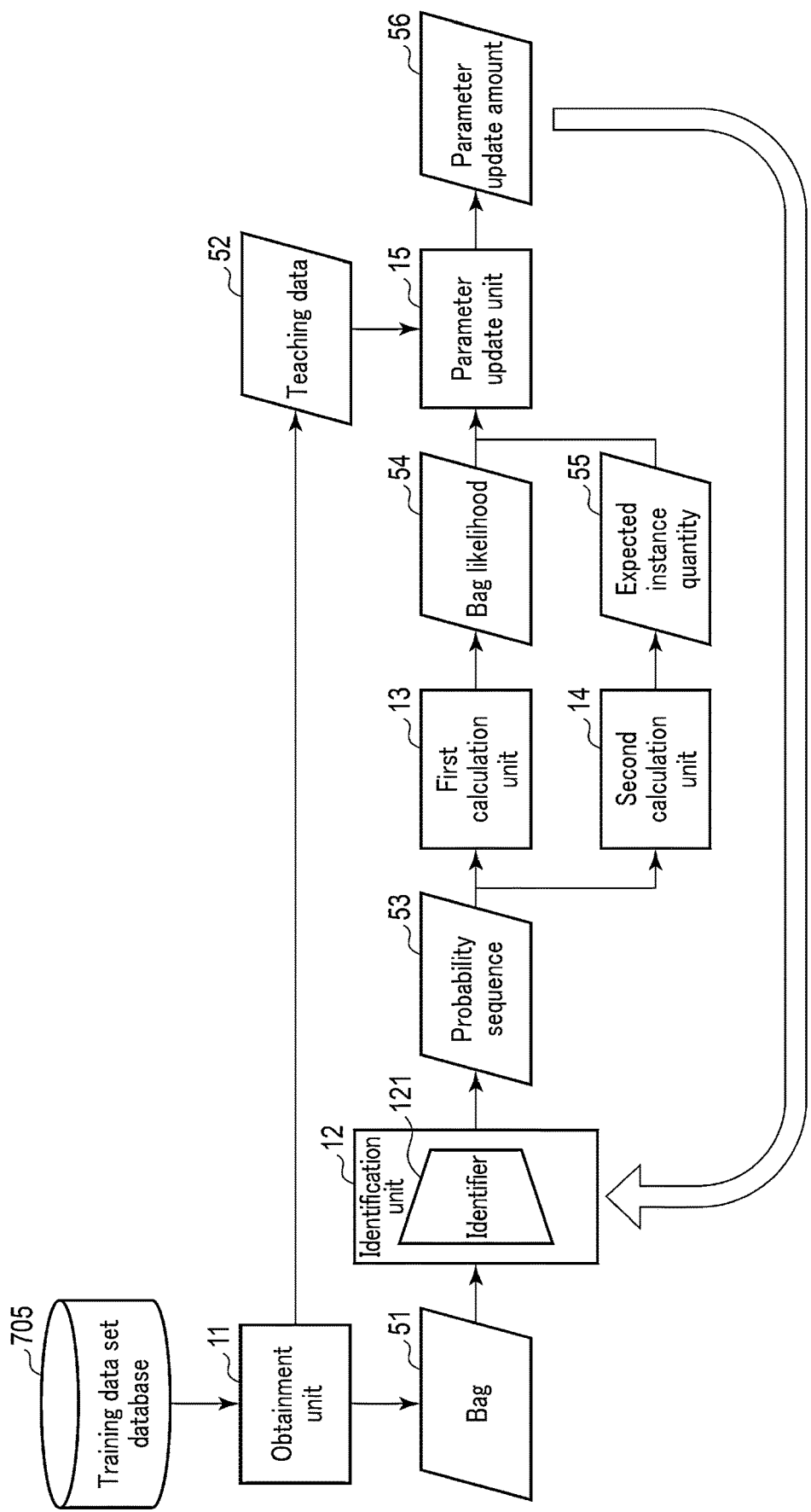
F I G. 5

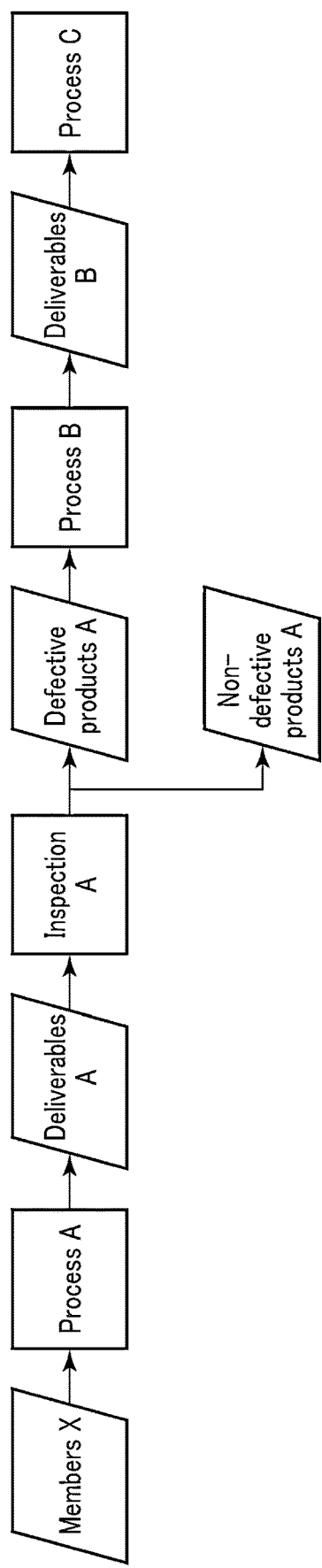
F I G. 6

TRAINING APPARATUS, TRAINING METHOD, AND STORAGE MEDIUM

CROSS-REFERENCE TO RELATED APPLICATIONS

This application is based upon and claims the benefit of priority from Japanese Patent Application No. 2022-193983, filed Dec. 5, 2022, the entire contents of which are incorporated herein by reference.

FIELD

Embodiments described herein relate generally to a training apparatus, method, and a storage medium.

BACKGROUND

Machine learning of an identifier for determining normal or abnormal of a product from the bag such as an article image is performed. In order to obtain high determination performance, a map in which normal or abnormal is taught for each instance such as a pixel, a partial image, or the like of an article image is ideally used as teaching data, but teaching for each instance requires a large cost. In a case where normal or abnormal is taught only to a bag, training processing is terminated in a case where one instance corresponding to an abnormality is found. In a case where an abnormal portion such as a flaw is large, an identifier obtained by such training processing cannot detect all the abnormal portion.

BRIEF DESCRIPTION OF THE DRAWINGS

FIG. 2 is a view illustrating an example of an article image (bag) obtained by imaging a normal tile.

FIG. 3 is a view illustrating an example of an article image (bag) obtained by imaging a tile including an abnormality.

FIG. 5 is a diagram schematically illustrating the training processing illustrated in FIG. 4.

FIG. 6 is a diagram illustrating an example of a product manufacturing process according to the present embodiment.

DETAILED DESCRIPTION

A training apparatus according to an embodiment includes an identification unit, a first calculation unit, a second calculation unit, and an update unit. The identification unit inputs a bag that is a set of instances to an identifier, and outputs a probability sequence including probabilities that instances belonging to the bag correspond to a detection target. The first calculation unit calculates a bag likelihood that is a probability that one or more specific instances corresponding to the detection target are included in the bag based on the probability sequence. The second calculation unit outputs an expected instance quantity that is a numerical value regarding the quantity of the specific instances included in the bag based on the probability sequence. The update unit calculates a parameter update amount that is an amount to which a parameter of the identifier is updated based on teaching data that is a numerical value regarding the quantity of the specific instances included in the bag, the bag likelihood, and the expected instance quantity, and updates the parameter of the identifier based on the parameter update amount.

Hereinafter, a training apparatus, method, and program according to the present embodiment will be described with reference to the drawings.

Training Apparatus

Figure 1:
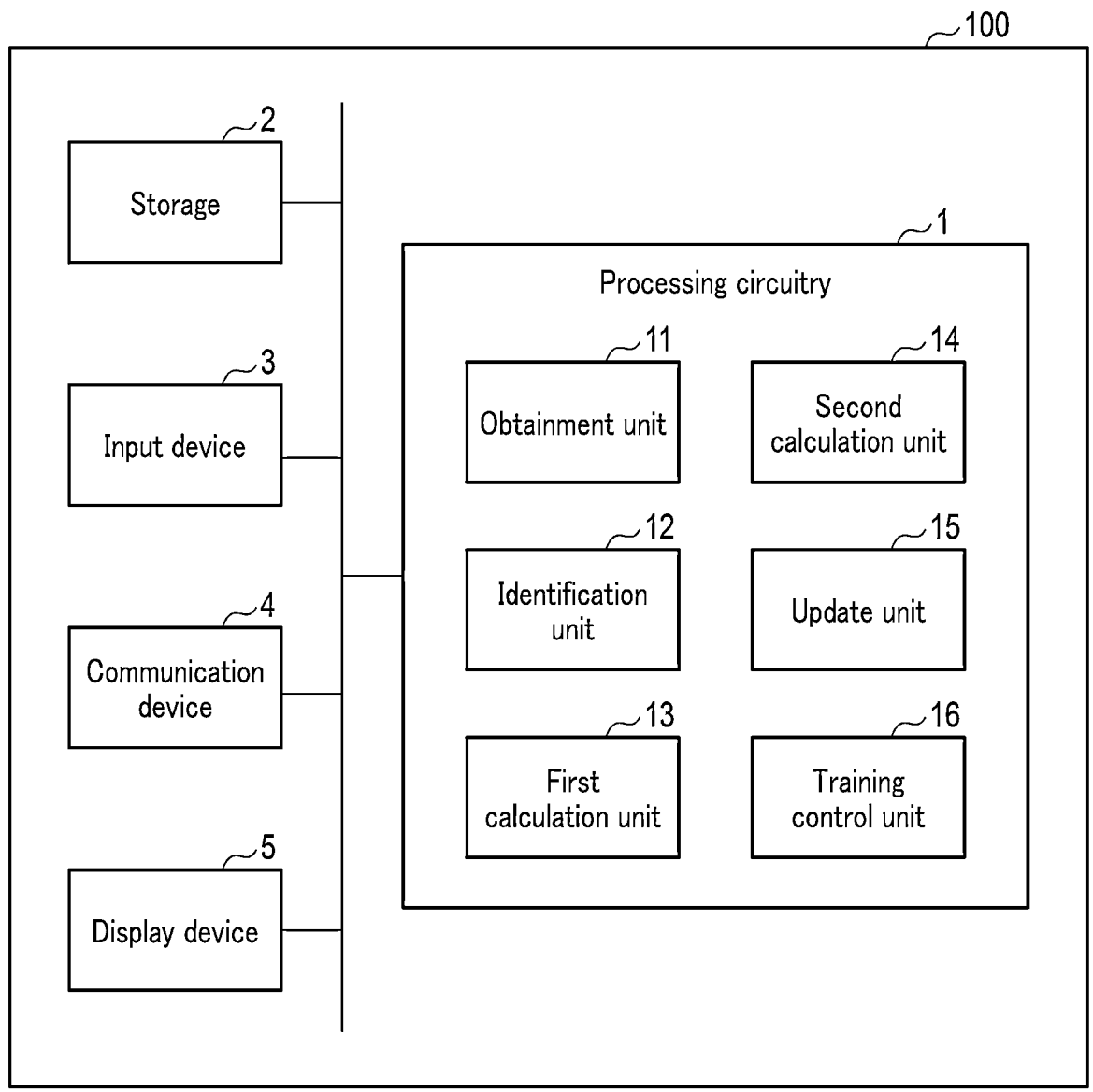
FIG. 1 is a diagram illustrating a configuration example of a training apparatus according to the present embodiment.

FIG. 1 is a diagram illustrating a configuration example of a training apparatus 100 according to the present embodiment. As illustrated in FIG. 1, the training apparatus 100 is a computer including a processing circuitry 1, a storage 2, an input device 3, a communication device 4, and a display device 5. Data communication among the processing circuitry 1, the storage 2, the input device 3, the communication device 4, and the display device 5 is performed via a bus.

The processing circuitry 1 includes a processor such as a central processing unit (CPU) and a memory such as a random access memory (RAM). The processing circuitry 1 includes an obtainment unit 11, an identification unit 12, a first calculation unit 13, a second calculation unit 14, an update unit 15, and a training control unit 16. The processing circuitry 1 implements functions of the respective units 11 to 16 by executing a training program. The training program is stored in a non-transitory computer-readable recording medium such as the storage 2. The training program may be implemented as a single program that describes all the functions of the respective units 11 to 16, or may be implemented as a plurality of modules divided into several functional units. Furthermore, the units 11 to 16 may be implemented by an integrated circuit such as an application specific integrated circuit (ASIC). In this case, they may be implemented in a single integrated circuit or may be individually implemented in a plurality of integrated circuits.

The obtainment unit 11 acquires a training sample from a training data set. The training sample is a combination of a bag and teaching data corresponding to the bag. The bag is data to be processed by the identifier. The bag is a set of instances. The identifier is a neural network that executes a task of determining whether a detection target such as a normal portion or an abnormal portion is included in the bag. The instance is a data element included in a bag. The instance is a determination target of the relevance of a detection target. The teaching data is a numerical value regarding the quantity of instances corresponding to a detection target (hereinafter, specific instances). The quantity of specific instances is, for example, the number of specific instances, a proportion of the specific instances among instances included in the bag, an area of the instances in the bag, a length (TV norm) of a perimeter of the instances, and the like.

The identification unit 12 inputs a bag that is a set of instances to the identifier, and outputs a probability sequence including probabilities that instances that belong to the bag correspond to a detection target. The identifier is a neural network including a series of network layers for converting the bag into a probability sequence. As the network layers, a fully connected layer, a convolution layer, a pooling layer, and/or a normalization layer may be used.

The first calculation unit 13 calculates a bag likelihood that is a probability that one or more specific instances are included in the bag based on the probability sequence output by the identification unit 12.

The second calculation unit 14 outputs an expected instance quantity that is a numerical value regarding the quantity of the specific instances included in the bag based on the probability sequence output by the identification unit 12.

The update unit 15 calculates a parameter update amount that is an amount to which a parameter of the identifier is updated based on teaching data that is a numerical value regarding the quantity of the specific instances included in the bag, the bag likelihood calculated by the first calculation unit 13, and the expected instance quantity calculated by the second calculation unit 14, and updates the parameter of the identifier based on the parameter update amount.

The training control unit 16 controls training processing for the identifier. The training control unit 16 determines whether an update end condition is satisfied, and repeats the training processing until the update end condition is determined to be satisfied by controlling the obtainment unit 11, the identification unit 12, the first calculation unit 13, the second calculation unit 14, and the update unit 15. In a case where the update end condition is determined to be satisfied, the training control unit 16 ends the training processing.

The storage 2 includes a read only memory (ROM), a hard disk drive (HDD), a solid state drive (SSD), an integrated circuit storage, or the like. The storage 2 stores the training program and the like.

The input device 3 inputs various commands from a user. As the input device 3, a keyboard, a mouse, various switches, a touch pad, a touch panel display, or the like can be used. An output signal from the input device 3 is supplied to the processing circuitry 1. Note that the input device 3 may be an input device of a computer connected to the processing circuitry 1 in a wired or wireless manner.

The communication device 4 is an interface for performing data communication with an external device connected to the training apparatus 100 via a network.

The display device 5 displays various types of information. As the display device 5, a cathode-ray tube (CRT) display, a liquid crystal display, an organic electro luminescence (EL) display, a light-emitting diode (LED) display, a plasma display, or any other display known in the art can be appropriately used. Furthermore, the display device 5 may be a projector.

Hereinafter, an operation example of the training apparatus 100 according to the present embodiment will be described.

First, a relationship between a bag and instances will be described with reference to FIGS. 2 and 3. Note that, in the examples of FIGS. 2 and 3, it is assumed that the bag is an image obtained by imaging an intermediate product (deliverable) generated in a manufacturing process of a manufactured article (hereinafter, the image is referred to an article image), and the instance is a partial image included in the article image. The manufactured article according to the present embodiment can be applied to any article, and is assumed to be a tile as an example. It is assumed that the detection target is a flaw generated in the tile.

FIG. 2 is a view illustrating an example of an article image (bag) 20 obtained by imaging a normal tile. As illustrated in FIG. 2, the bag 20 is partitioned into a plurality of instances 21. The bag 20 is taught "normal" and thus each of the instances 21 is also "normal".

FIG. 3 is a view illustrating an example of an article image (bag) 30 obtained by imaging a tile including an abnormality. As illustrated in FIG. 3, the bag 30 is partitioned into a plurality of instances 31. A flaw 32 is projected on the bag 30. Therefore, the bag 30 is taught "abnormal". An instance 311 in which the flaw 32 is not projected is normal, and instances 312 and 313 in which the flaw 32 is projected are abnormal.

Here, issues of Non-patent Literature 1 (Pathak et. al. "FULLY CONVOLUTIONAL MULTI-CLASS MULTIPLE INSTANCE LEARNING," ICLR, 2015) and Non-patent Literature 2 (Pathak et. al. "Constrained Convolutional Neural Networks for Weakly Supervised Segmentation," Proc. ICCV) will be described.

As described above, in order to obtain high determination performance by machine learning, a map in which whether an article image is normal or abnormal is taught for each instance is ideally given, but teaching for each instance incurs a large cost. As a teaching method with lower cost, a multiple instance learning (MIL) in which a binary flag indicating whether a detection target is included is given to an image as in Non-patent Literature 1 is known.

The MIL is a framework in which issues that cannot be taught directly to an instance but can be taught to a bag such as an image can be handled in an integrated manner. For example, there may be a case where a defect rate can be known for a rough unit such as a lot that is a set of products although each of the products cannot be taught in an inspection of mass-produced products. Note that the number of instances included in a bag is not necessarily limited to one. For example, in a case where the minimum number of instances occupied by the detection target in the image is known, machine learning may be performed using the minimum number of instances as a constraint as in Non-patent Literature 2.

In the method of Non-patent Literature 1, in a use example such as flaw detection in which the number of instances occupied by a detection target is small with respect to the number of instances of the entire image, there is an issue that only a portion in which a flaw is deep and a clear difference in brightness occurs is detected, and a portion in which a flaw is shallow and the like is overlooked. This is because a parameter of an identifier is updated in a case where the identifier during training detects at least one excessive instance included in an image for which teaching that there is no flaw was performed, whereas the parameter of the identifier is not updated, even in a case where an actual flaw is large, as long as only one instance can be detected in an image for which teaching that there is a flaw was performed.

For example, in the example of FIG. 3, the instance 312 and the instance 313 include a flaw, but the flaw is deep in the instance 312 and the flaw is shallow in the instance 313. In such a case, the identifier detects the instance 312 in which there is a clear difference in brightness as compared with the normal instance 311 as an abnormality, but overlooks the instance 313 in which there is not much difference in brightness. Regarding this overlooking, even in Non-patent Literature 2, an improvement effect cannot be obtained in a case where the minimum instance number is smaller than the total instance number of the image. Therefore, an object of the present embodiment is to obtain an identifier having less overlooking of an instance by machine learning even under such a condition that teaching can be performed only to a bag coarser than instances.

Figure 4:
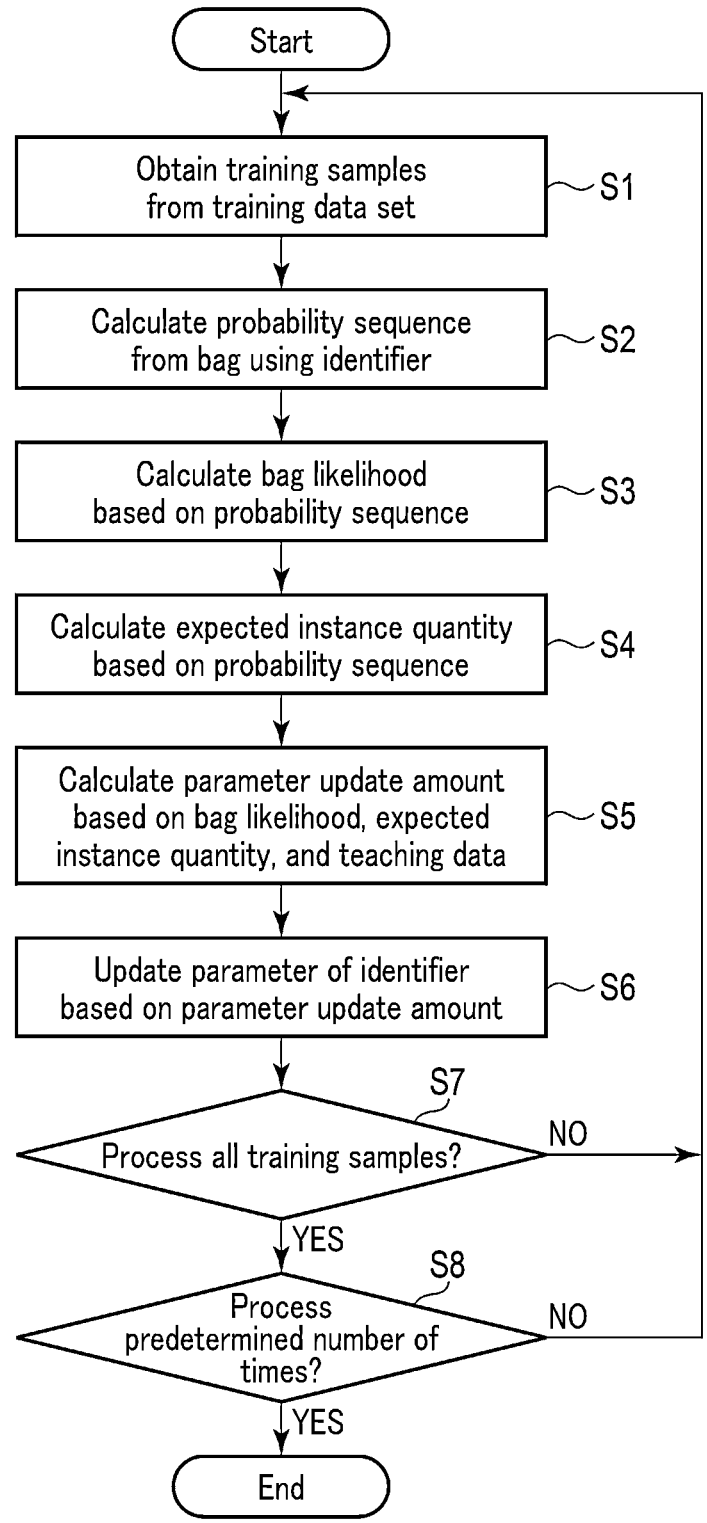
FIG. 4 is a diagram illustrating an example of a processing procedure of training processing by the training apparatus.

FIG. 4 is a diagram illustrating an example of a processing procedure of the training processing by the training apparatus 100. FIG. 5 is a diagram schematically illustrating the training processing by the training apparatus 100. As illustrated in FIGS. 4 and 5, the obtainment unit 11 obtains training samples from a training data set (step S1). In step S1, as an example, the obtainment unit 11 obtains a plurality of training samples included in a mini-batch from a training data set database 705. As described above, the training samples each include a bag 51 and teaching data 52. The bag 51 is an article image in which a manufactured article that is an inspection target is projected. The detection target is an object such as a flaw. The teaching data 52 includes a flag and a correct instance quantity. The flag includes a value of "1" in a case where the bag 51 includes a specific instance in which an object such as a flaw appears, and a value of "0" in a case where the bag 51 does not include a specific instance. The correct instance quantity is a numerical value regarding the quantity of specific instances, and is assumed to be the number of specific instances as an example. In a case where the instance is a partial image, the specific instance is a partial image including a flaw, and in a case where the instance is a pixel, the specific instance is a pixel including a flaw. The specific instance is also referred to as a defect instance.

In a case where step S1 is performed, the identification unit 12 calculates a probability sequence 53 from the bag 51 obtained in step S1 using the identifier 121 (step S2). Specifically, the identification unit 12 inputs the bag 51 to the identifier 121. The identifier 121 performs forward propagation processing on the bag 51 and calculates probabilities that respective instances correspond to specific instances. A combination of a plurality of probabilities corresponding to a plurality of respective instances included in the bag 51 is included in the probability sequence 53.

In a case where step S2 is performed, the first calculation unit 13 calculates a bag likelihood 54 based on the probability sequence 53 calculated in step S2 (step S3). Specifically, the first calculation unit 13 identifies the maximum value of a plurality of probabilities included in the probability sequence 53. The identified maximum value is output as the bag likelihood 54.

In a case where step S3 is performed, the second calculation unit 14 calculates an expected instance quantity 55 based on the probability sequence 53 calculated in step S2 (step S4). Specifically, the second calculation unit 14 calculates the sum of the plurality of probabilities included in the probability sequence 53. The sum is output as the expected instance quantity 55.

In a case where step S4 is performed, the update unit 15 calculates a parameter update amount 56 based on the bag likelihood 54 calculated in step S3, the expected instance quantity 55 calculated in step S4, and the teaching data 52 obtained in step S1 (step S5). Specifically, the update unit 15 first calculates a labeling loss and an instance quantity loss.

The update unit 15 calculates the labeling loss based on the bag likelihood 54 and the teaching data 52. The labeling loss is binary cross entropy based on the bag likelihood 54 and the teaching data 52. The smaller the difference between a correct label and the bag likelihood 54, the smaller the labeling loss. The correct label takes a predetermined value (for example, "1") in a case where the quantity of the number of defect instances is larger than the lower limit (for example, "0"). The correct label is generated by the update unit 15 based on the number of defect instances. The labeling loss can ensure that an identification result of an instance obtained by the identifier 121 is "1" in a case where it is a detection target and "0" in a case where it is not.

The update unit 15 calculates an instance quantity loss based on the expected instance quantity 55 and the number of defect instances in the teaching data 52. The instance quantity loss is an index for evaluating a difference between the expected instance quantity 55 and the number of defect instances. Specifically, the instance quantity loss is obtained by an average of squares of differences between expected instance quantities 55 and the numbers of defect instances over a plurality of training samples, that is, a mean square error. The labeling loss can ensure that the sum of probability sequences 53 is close to the number of defect instances.

After calculating the labeling loss and the instance quantity loss, the update unit 15 calculates the parameter update amount 56 for simultaneously reducing the labeling loss and the instance quantity loss. Specifically, the update unit 15 calculates a loss function based on the labeling loss and the instance quantity loss. The loss function is defined by a weighted sum of the labeling loss and the instance quantity loss. The update unit 15 calculates the parameter update amount 56 such that the loss evaluated by the loss function takes a minimum value.

In a case where step S5 is performed, the update unit 15 updates a parameter of the identifier 121 based on the parameter update amount 56 calculated in step S5 (step S6). The parameter of the identifier 121 means a weight parameter or bias of conversion between network layers. As an example, the update unit 15 calculates the parameter update amount 56 by a stochastic gradient descent method. That is, the update unit 15 calculates the gradient of the loss function by back propagation processing of the identifier 121, and calculates the parameter update amount 56 based on the calculated gradient and a learning rate. Note that the method of calculating the parameter update amount 56 is not limited to the stochastic gradient descent method, and may be performed by Adam, its evolution method, or any other method.

In a case where step S6 is performed, the training control unit 16 determines whether all the training samples were processed (step S7). The processing from steps S1 to S7 is repeated in units of mini-batches as an example. In step S7, whether the processing was performed on the training samples included in all the mini-batches is determined. In a case where it was determined that not all the training samples are processed (step S7: NO), steps S1 to S7 are executed for a new mini-batch.

Then, in a case where it was determined in step S7 that all the training samples were processed (step S7: YES), the training control unit 16 determines whether processing was performed a predetermined number of times (step S8). One sequence of processing for all the mini-batches is called epoch. The predetermined number means the number of epochs at which the training processing is terminated, and may be set to any numerical value. In a case where it was determined that the processing is not performed the predetermined number of times (step S8: NO), steps S1 to S8 are repeated.

Then, in a case where it was determined in step S8 that the processing was performed the predetermined number of times (step S8: YES), the training control unit 16 ends the training processing. That is, the training control unit 16 stores the parameter of the identifier 121 at the time at which it was determined that the processing was performed the predetermined number of times in the storage 2 as a trained parameter. The identifier 121 to which the trained parameter is assigned is incorporated into a manufacturing process of manufactured articles and used to determine whether the manufactured articles are defective/non-defective.

Thus, the training processing illustrated in FIGS. 4 and 5 ends.

Modification of Training Processing

The above training processing can be variously changed.

As an example, the instance quantity loss does not necessarily need to be an average of squares of differences between correct instance quantities and expected instance quantities, and may be an average of absolute values or the like of the differences.

The instance quantity loss may be designed to have a larger value as an expected instance quantity is smaller than a value obtained by subtracting a predetermined threshold from the lower limit of a correct instance quantity. Specifically, the instance quantity loss L(N, M, T) may be a nonlinear function such as marginal ranking loss defined using the lower limit N of the correct instance quantity, the expected instance quantity M, and a margin T different for each of the training samples as in the following Formula (1).

$$L(N,M,T)=\max(0,N-M-T) \quad (1)$$

The instance quantity loss L(N, M, T) in Formula (1) takes "0" in a case where the expected instance quantity M is larger than a value (subtraction value) obtained by subtracting the margin (threshold) T from the lower limit N, and takes a value obtained by subtracting the expected instance quantity M from the subtraction value in a case where the expected instance quantity M is smaller than the subtraction value. The instance quantity loss L(N, M, T) of Formula (1) serves to increase the quantity of detected instances in a case where the quantity of instances detected by the identifier falls below the taught quantity by the margin T or more.

There is a high possibility that the training apparatus 100 is operated under a condition that the correct instance quantity cannot be accurately given. Even in this case, accuracy can be maintained using the margin T. In a case where over-detection of instances is an issue, the instance quantity loss may be designed to have a larger value as the expected instance quantity is larger than the sum of the lower limit of the correct instance quantity and the predetermined threshold. Specifically, the instance quantity loss L(N, M, T) of the following Formula (2) may be used.

$$L(N,M,T)=\max(0,M-N-T) \quad (2)$$

The instance quantity loss L(N, M, T) in Formula (2) takes "O" in a case where a value (subtraction value) obtained by subtracting the sum of the lower limit N and the margin T from the expected instance quantity M is less than "0", and takes the subtraction value in a case where the subtraction value exceeds "0". The instance quantity loss L(N, M, T) of Formula (2) serves to decrease the number of detected instances in a case where the number of instances detected by the identifier exceeds the taught quantity by the margin T or more.

In addition, there is a possibility that the correct instance quantity is quantized and given, and in this case, the margin T may be set to a step width of quantization. Furthermore, the instance quantity loss may be used by the functions described above being combined by a method such as weighted sum. Furthermore, in a case where the appearance frequency distribution of a defect is known, the instance quantity loss may be calculated using inter-probability distribution processing such as the Mahalanobis distance.

Summation

As described above, the training apparatus 100 according to the present embodiment includes the identification unit 12, the first calculation unit 13, the second calculation unit 14, and the update unit 15. The identification unit 12 inputs a bag that is a set of instances to the identifier, and outputs a probability sequence including probabilities that instances that belong to the bag correspond to a detection target. The first calculation unit 13 calculates a bag likelihood that is a probability that one or more specific instances corresponding to the detection target are included in the bag based on the probability sequence. The second calculation unit 14 outputs an expected instance quantity that is a numerical value regarding the quantity of the specific instances included in the bag based on the probability sequence. The update unit 15 calculates a parameter update amount that is an amount to which a parameter of the identifier is updated based on teaching data that is a numerical value regarding the quantity of the specific instances included in the bag, the bag likelihood, and the expected instance quantity, and updates the parameter of the identifier based on the parameter update amount.

According to the above configuration, recognition accuracy of instances can be improved by a parameter of an identifier being updated based a bag likelihood and an expected instance quantity. This is because a minimization problem of a loss that is larger as instances that are overlooked and/or over-detected increase is solved, and instances that are overlooked and/or over-detected decrease. Furthermore, since teaching data according to the present embodiment is a numerical value regarding the quantity of specific instances included in a bag, it is not necessary to teach individually for each instance unlike a comparative example using teaching data indicating defective or non-defective for each instance. For example, in a case where a flaw is detected from an image, the parameter update amount can be controlled such that the identifier gives a high probability to instances of a quantity corresponding to the area of the flaw using a correct instance quantity according to the area of the flaw for training, and thus, overlooking of the flaw by the identifier can be reduced without an accurate flaw region being taught using a map or the like. Since the "numerical value regarding the quantity of specific instances" used in the present embodiment is often managed as a yield in a manufacturing process, the labor of creating teaching data according to the present embodiment is reduced as compared with that in the above-described comparative example. Furthermore, in the present embodiment, since the loss function to be used has a positive correlation with the labeling loss, recognition accuracy of a bag can be maintained.

Thus, according to the various embodiments described above, a training apparatus, method, and program capable of improving detection accuracy of instances using teaching in units of bags can be provided.

Training Data Set Generation System

Next, a training data set generation system according to the present embodiment will be described. Note that, in the following description, it is assumed that the identifier according to the present embodiment is used to determine a defective product or a non-defective product of a deliverable in a certain process in a manufacturing process including a plurality of processes.

FIG. 6 is a diagram illustrating an example of a product manufacturing process according to the present embodiment. As illustrated in FIG. 6, members X are processed into deliverables A in a process A. The deliverables A are classified into non-defective products A or defective products A by an inspection A. The non-defective products A are processed into deliverables B in a process B, and further processed into deliverables in a process C. Final target products are produced by such processes being repeated.

As illustrated in FIG. 6, in a manufacturing process including a plurality of processes, it is useful for improving a yield in a case where an inspection of deliverables is automated in each of the processes, the quantity of defective products passed to the subsequent process is reduced, and the cause of an abnormality in the corresponding process can be investigated. It is assumed that the process A outputs the deliverables A that are sets of the members X such as groups of a large number of components or large sheet-like materials. In the subsequent inspection A, the deliverables A are separated into the non-defective products A and the defective products A. As a specific example, in the inspection A, the appearance of a product is imaged, and the product is classified into a non-defective product A in a case where no flaw appears in the image, and the product is classified into a defective product A in a case where a flaw appears in the image.

The training apparatus 100 according to the present embodiment is used, for example, for training of the identifier for automating the inspection A in FIG. 6. That is, a product is classified into a non-defective product A or a defective product A by the identifier based on the article image obtained in the inspection A.

Figure 7:
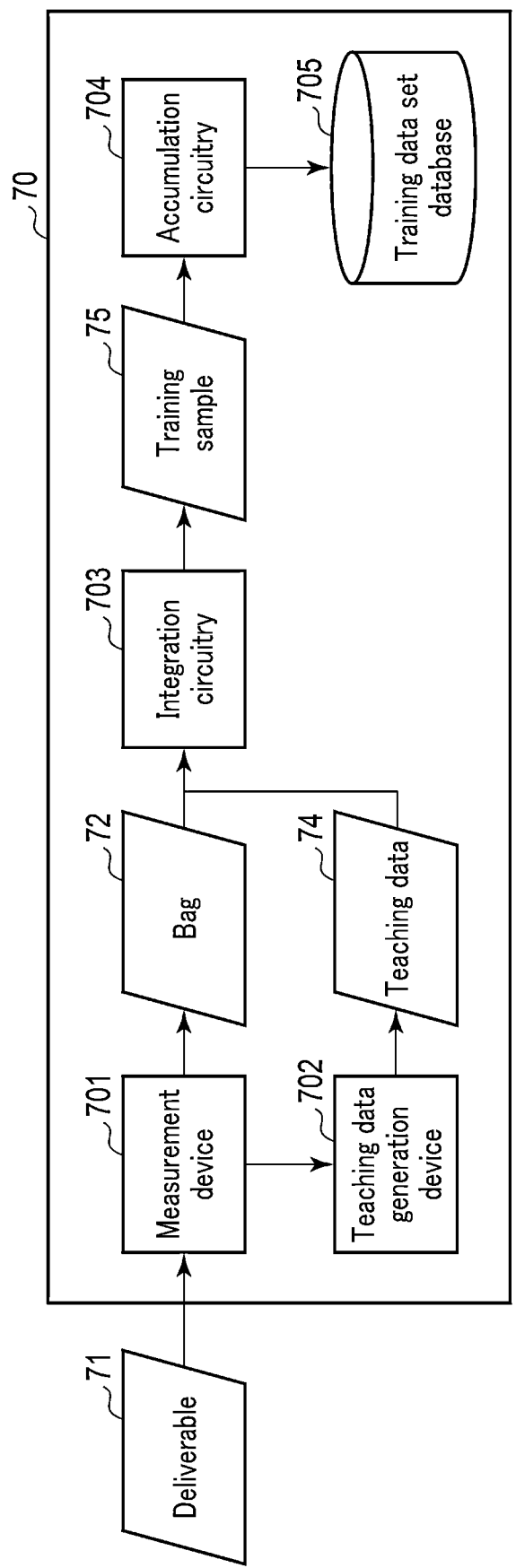
FIG. 7 is a diagram illustrating a configuration example of a training data set generation system according to the present embodiment.

FIG. 7 is a diagram illustrating a configuration example of a training data set generation system 70 according to the present embodiment. As illustrated in FIG. 7, the training data set generation system 70 includes a measurement device 701, a teaching data generation device 702, an integration circuitry 703, an accumulation circuitry 704, and the training data set database 705. The measurement device 701, the teaching data generation device 702, the integration circuitry 703, the accumulation circuitry 704, and the training data set database 705 are connected so as to be able to perform data communication with each other in a wired or wireless manner.

The measurement device 701 measures a deliverable A (hereinafter, deliverable 71) in the process A, and generates a bag 72 that is measurement data representing a measurement result of the deliverable 71. The teaching data generation device 702 measures the correct instance quantity included in the deliverable 71, that is, the quantity of instances including defects (hereinafter, defect instance quantity), and generates teaching data 74 indicating the quantity. The integration circuitry 703 integrates the bag 72 and the teaching data 74 and generates training sample 75. The accumulation circuitry 704 accumulates the training sample 75 in the training data set database 705. The training sample 75 is generated by cooperation of the measurement device 701, the teaching data generation device 702, and the integration circuitry 703 every time the deliverable 71 is generated in the process A of the manufacturing process illustrated in FIG. 6, and is accumulated in the training data set database 705 by the accumulation circuitry 704. A plurality of training samples is included in a training data set. The training data set database 705 is a computer including a storage such as an HDD or an SSD that systematically stores a plurality of training samples. Note that the training data set generation system 70 may include the training apparatus 100.

As an example, the bag 72 is an article image obtained by imaging the entire one deliverable A, and an instance is a partial image included in the article image and corresponds to a part of the deliverable A. The defect instance means a partial image in which a detection target such as a flaw appears. In this case, the measurement device 701 includes an optical camera that images the deliverable A and generates an article image in which the appearance of the product A appears. The teaching data generation device 702 includes an image processing processor that measures the defect instance quantity from the article image obtained by the measurement device 701. Note that the teaching data generation device 702 may perform processing of measuring the defect instance quantity from the article image by a full-automation algorithm or may perform the processing by a semi-automation algorithm according to a manual command. The integration circuitry 703 includes an information processing processor that associates the bag 72 with the teaching data 74. Combinations of the bag 72 and the teaching data 74 associated with each other are included in the training sample 75. The accumulation circuitry 704 includes an information processing processor that reads and writes the training sample 75 to and from the training data set database 705.

The bag 72 is not limited to only an image obtained by imaging the entire deliverable A. For example, in a case where the deliverable A is a mass-produced component, the bag 72 may be an image in which a series of deliverables A appears, the instance may be an article image obtained by imaging each of the deliverables A in the series of the deliverables A, and the defect instance may be an article image in which a defective product appears among the article images. Furthermore, the instance is not necessarily limited to an image. For example, in a case where the deliverable A is a mass-produced component, the instance may be measurement data obtained by measuring the component using some apparatus, and the defect instance may be measurement data of a defective product in the measurement data. As the measurement data, for example, measurement data from a measurement device of a various type such as a current detection device, a voltage detection device, a vibration detection device, a sound collection device, a distance measurement device, a position detection device, or a heat detection device can be used.

Example 1

The bag according to Example 1 is an article image, and the instance is a pixel included in the article image. The correct instance quantity is a length of a flaw generated in an article included in the article image. The expected instance quantity is the sum of a plurality of probabilities obtained from a plurality of instances arranged along one direction of an article image.

Figure 8:
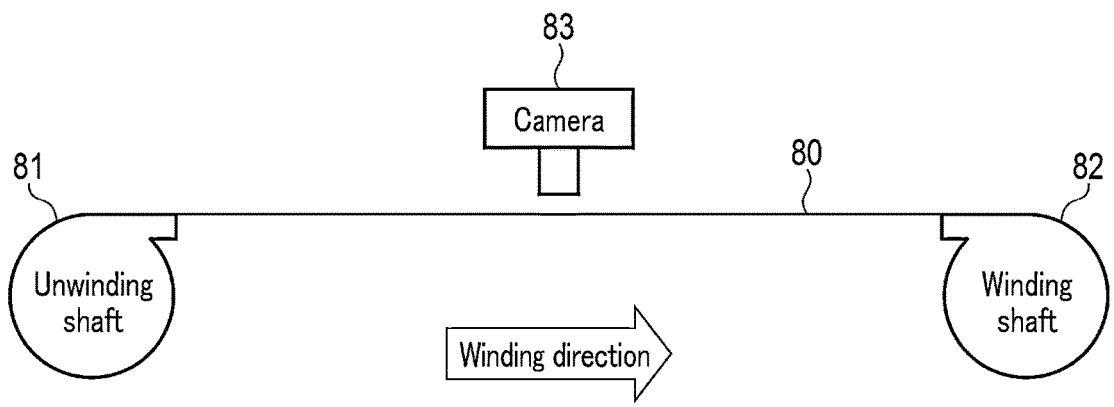
FIG. 8 is a diagram illustrating an outline of a manufacturing process according to the present embodiment.
Figure 9:
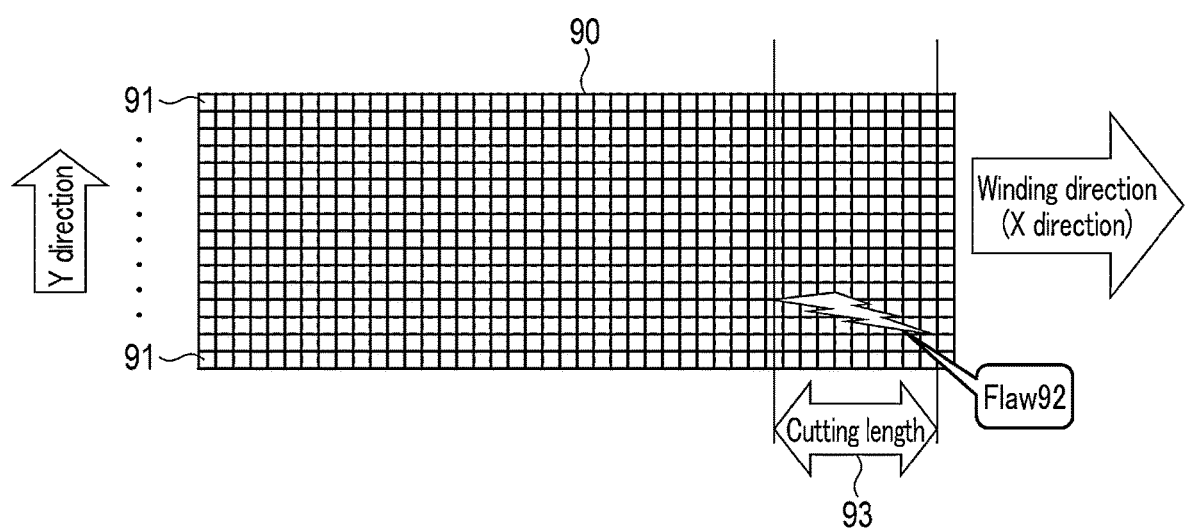
FIG. 9 is a diagram illustrating an example of an article image of a sheet illustrated in FIG. 8.

FIG. 8 is a diagram illustrating an outline of a manufacturing process according to the present embodiment. The deliverable related to the manufacturing process illustrated in FIG. 8 is a sheet 80. The surface of the sheet 80 unwound from an unwinding shaft 81 is processed, and the processed sheet 80 is wound by a winding shaft 82. For inspection, a camera 83 images the surface of the processed sheet 80 and generates an image corresponding to a bag. FIG. 9 is a diagram illustrating an example of an article image 90 of the sheet 80 illustrated in FIG. 8. As illustrated in FIG. 9, the article image 90 includes a plurality of partial images 91. In a case where the product is defective, a detection target such as a streaky flaw 92 appears in the article image 90. A training sample is generated from the article image 90 by the training data set generation system 70.

In a case where the flaw 92 is detected by the teaching data generation device 702 or the like, the defect is removed in the manufacturing process. Specifically, a method of pulling out a defective portion from the unwinding shaft 81 and/or the winding shaft 82 and cutting the defective portion is adopted. In this case, the correct instance quantity is a cutting length 93 illustrated in FIG. 9. The cutting length 93 is defined by, for example, the quantity of defect instances along the winding direction. The teaching data generation device 702 performs image processing on the article image, extracts an image region of the flaw 92, and counts the number of pixels along the winding direction of the extracted image region. The number of pixels is set as the correct instance quantity.

A method of calculating the expected instance quantity in a case where the correct instance quantity is the cutting length 93 will be described. At the time of training, the image 90 is processed by the identifier and converted into an abnormality map corresponding to a probability sequence. Each instance of the abnormality map is assigned a value of a probability that a portion of the sheet corresponding to the instance corresponds to a defect. For example, an instance corresponding to the flaw 92 is assigned a high probability value, and an instance without the flaw 92 is assigned a low probability value. In this case, the second calculation unit 14 extracts an image region corresponding to the flaw 92 from the abnormality map, sets a line along the winding direction (hereinafter, X direction) in the extracted image region, and identifies the maximum value of probability values of a plurality of instances along the Y direction (direction orthogonal to the X direction) for each position in the X direction. The second calculation unit 14 may calculate the expected instance quantity by adding the identified maximum value of each X direction position along the winding direction.

Example 2

The bag according to Example 2 is an article image. The article image is divided into two or more small regions. Each of the small regions includes two or more instances in longitudinal and/or lateral direction. The expected instance quantity is the sum of probabilities obtained from small regions arranged along one direction of the article image among a plurality of small regions, and the correct instance quantity is a length of a flaw generated in the article included in the article image.

Specifically, the second calculation unit 14 according to Example 2 divides an abnormality map into a plurality of small regions along the winding direction. The small regions each include two or more instances in each of the Y direction and the X direction. The shape of the small regions may be changed according to an actual process. For example, in a case where the deliverable of an automated process has a plate shape and is cut into a tile shape and used in the next process, the shape of the small regions may be a rectangle having the same shape as the tile. The second calculation unit 14 identifies the maximum value of probability values of a plurality of instances included in each of the plurality of small regions for the small region. The second calculation unit 14 calculates the expected instance quantity by adding the identified maximum value of each of the small regions along the winding direction.

Example 3

The teaching data generation device 702 according to Example 3 generates the teaching data 74 by another algorithm. For example, in the manufacturing process illustrated in FIG. 6, the quantity of members X, the total quantity of deliverables A, the total quantity of non-defective products A with respect to the total quantity of the deliverables A, the quantity of defective products A discarded in the inspection A, and the like may be recorded for management of the yield. Furthermore, even in a case where the total quantity of the non-defective products A is not known, the total quantity of the non-defective products A may be analogized from the quantity of members input in the subsequent process B and the quantity of deliverables in the process B. The teaching data generation device 702 may generate the teaching data 74 that is the quantity of defect instances based on these pieces of information. As described above, even in a case where the inspection A is automated in the manufacturing process including a plurality of processes as illustrated in FIG. 6, a defect rate of the process A can be roughly determined from the quantity of members input in the process B and the like even in a case where there is no detailed record of the inspection A.

Generalization

As described above, the training data set generation system 70 includes the measurement device 701, the teaching data generation device 702, the integration circuitry 703, the accumulation circuitry 704, and the training data set database 705. The measurement device 701 measures a deliverable in a manufacturing process, and generates a bag that is measurement data representing a measurement result of the deliverable. The teaching data generation device 702 measures the quantity of defective portions included in a deliverable, and generates teaching data indicating the quantity. The integration circuitry 703 integrates a bag and teaching data and generates a training sample. The accumulation circuitry 704 accumulates a training sample in the training data set database 705.

According to the above configuration, a training sample to be used for the training apparatus 100 can be generated and accumulated. Currently, there is a case where individually recording which component of a deliverable A is a defective product and which component is a non-defective product is not performed due to an increase in work cost or the like. As a specific example, even in a case where there is an image obtained by imaging the appearance of a product, a map in units of instances indicating portions of a flaw in the image is not created in many cases. In the present embodiment, since the quantity of defective portions included in a deliverable is used as teaching data instead of a map indicating defective/non-defective, the labor and load for generating a map can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A training apparatus comprising a processing circuitry that inputs a bag that is a set of an instance to an identifier and outputs a probability sequence including a probability that each instance belonging to the bag corresponds to a detection target, calculates a bag likelihood based on the probability sequence, the bag likelihood being a probability that one or more specific instances corresponding to the detection target are included in the bag, outputs an expected instance quantity based on the probability sequence, the expected instance quantity being a numerical value regarding a quantity of the specific instances included in the bag, and calculates a parameter update amount that is an amount to which a parameter of the identifier is updated based on teaching data that is a numerical value regarding a quantity of the specific instances included in the bag, the bag likelihood, and the expected instance quantity, and updates a parameter of the identifier based on the parameter update amount.

2. The training apparatus according to claim 1,
wherein the bag likelihood is a maximum value of a probability included in the probability sequence,
the expected instance quantity is a sum of a probability included in the probability sequence, and
the processing circuitry generates a correct label that takes a predetermined value in a case where a quantity of the specific instances is larger than a lower limit, and calculates the parameter update amount for simultaneously reducing a labeling loss and an instance quantity loss,
wherein the labeling loss takes a smaller value as a difference between the correct label and the bag likelihood is smaller, and
the instance quantity loss is a difference between the teaching data and the expected instance quantity.

3. The training apparatus according to claim 2,
wherein the instance quantity loss is an average of an absolute value or a mean square error of a difference between a quantity of the specific instances and the expected instance quantity, and
the processing circuitry calculates the parameter update amount based on a loss function that is a weighted sum of the labeling loss and the instance quantity loss.

4. The training apparatus according to claim 2, wherein the instance quantity loss has a larger value as the expected instance quantity is smaller than a value obtained by subtracting a predetermined threshold from a lower limit of a quantity of the specific instances.

5. The training apparatus according to claim 2, wherein the instance quantity loss has a larger value as the expected instance quantity is larger than a sum of a lower limit of a quantity of the specific instances and a predetermined threshold.

6. The training apparatus according to claim 2,
wherein the bag is an image of an article,
the instance is a pixel included in the image, and
a quantity of the specific instances is a length of a streaky flaw generated in the article included in the image.

7. The training apparatus according to claim 6, wherein the expected instance quantity is a sum of a plurality of probabilities obtained from a plurality of the instances arranged along one direction of the image.

8. The training apparatus according to claim 7,
wherein the image is divided into a plurality of regions,
wherein each of the regions includes two or more of the instances in a longitudinal direction and/or a lateral direction, and the expected instance quantity is a sum of a probability obtained from a region arranged along one direction of the image among the regions.

9. The training apparatus according to claim 1,
wherein the bag is an image obtained by imaging an article in a manufacturing process, and
the identifier determines whether the article is defective or non-defective.

10. The training apparatus according to claim 9,
wherein the bag is an image in which one article appears, and
the instance corresponds to a portion of the article.

11. The training apparatus according to claim 9,
wherein the bag is an image in which a series of articles appears, and
the instance corresponds to each article of the series of articles.

12. A training method comprising:
inputting a bag that is a set of an instance to an identifier and outputting a probability sequence including a probability that each instance belonging to the bag corresponds to a detection target;
calculating a bag likelihood based on the probability sequence, the bag likelihood being a probability that one or more specific instances corresponding to the detection target are included in the bag;
outputting an expected instance quantity based on the probability sequence, the expected instance quantity being a numerical value regarding a quantity of the specific instances included in the bag; and
calculating a parameter update amount that is an amount to which a parameter of the identifier is updated based on teaching data that is a numerical value regarding a quantity of the specific instances included in the bag, the bag likelihood, and the expected instance quantity, and updating a parameter of the identifier based on the parameter update amount.

13. A non-transitory computer readable medium including computer executable instructions, wherein the instructions, when executed by a processor, cause the processor to perform operations comprising:
inputting a bag that is a set of an instance to an identifier and outputting a probability sequence including a probability that each instance belonging to the bag corresponds to a detection target;
calculating a bag likelihood based on the probability sequence, the bag likelihood being a probability that one or more specific instances corresponding to the detection target are included in the bag;
outputting an expected instance quantity based on the probability sequence, the expected instance quantity being a numerical value regarding a quantity of the specific instances included in the bag; and
calculating a parameter update amount that is an amount to which a parameter of the identifier is updated based on teaching data that is a numerical value regarding a quantity of the specific instances included in the bag, the bag likelihood, and the expected instance quantity, and updating a parameter of the identifier based on the parameter update amount.

* * * * *